(12) United States Patent
Lai et al.

(10) Patent No.: US 6,170,512 B1
(45) Date of Patent: Jan. 9, 2001

(54) FLOW CONTROL DEVICE

(75) Inventors: Kuei-Hsi Lai; Kuo-Feng Huang, both of Hsin-Chu Hsien; Ming-Che Yang, Kao-Hsiung; Hung-Lung Mar, Miao-Li Hsien, all of (TW)

(73) Assignee: United Microelectronics Corp., Hsin-Chu (TW)

( * ) Notice: Under 35 U.S.C. 154(b), the term of this patent shall be extended for 0 days.

(21) Appl. No.: 09/431,938

(22) Filed: Nov. 1, 1999

(51) Int. Cl.[7] ........................................... G05D 7/06
(52) U.S. Cl. ................................. 137/209; 137/486
(58) Field of Search ........................... 137/209, 486

(56) References Cited

U.S. PATENT DOCUMENTS 3,380,462 * 4/1968 Schieber et al. .................. 137/209 X
5,148,945 * 9/1992 Geatz ............................... 137/209 X

* cited by examiner

Primary Examiner—Gerald A. Michalsky
(74) Attorney, Agent, or Firm—Winston Hsu

(57) ABSTRACT

A supply apparatus comprises a storage tank, a chemical flow pipe to route a chemical solution into a semiconductor processing room, a pressurizing apparatus to supply gas to the storage tank to make the chemical solution flow into the processing room, and an electro-Pneumatic regulator valve to adjust the pressure of the input gas. The flow control device comprises a flow sensor, a set-up apparatus, and a processor for generating a control signal to the pressurizing apparatus depending on a difference between a target value and a measurement value to adjust the flow of the chemical solution in the chemical flow pipe. The flow sensor comprises a hollow cylinder, a choking magnetic core movably positioned inside the hollow cylinder, and a first and second conductive coil wrapped around the outer wall of the hollow cylinder which uses alternating current to generate a magnetic flux and sense a change in the magnetic flux to measure the flow of chemical solution.

4 Claims, 4 Drawing Sheets

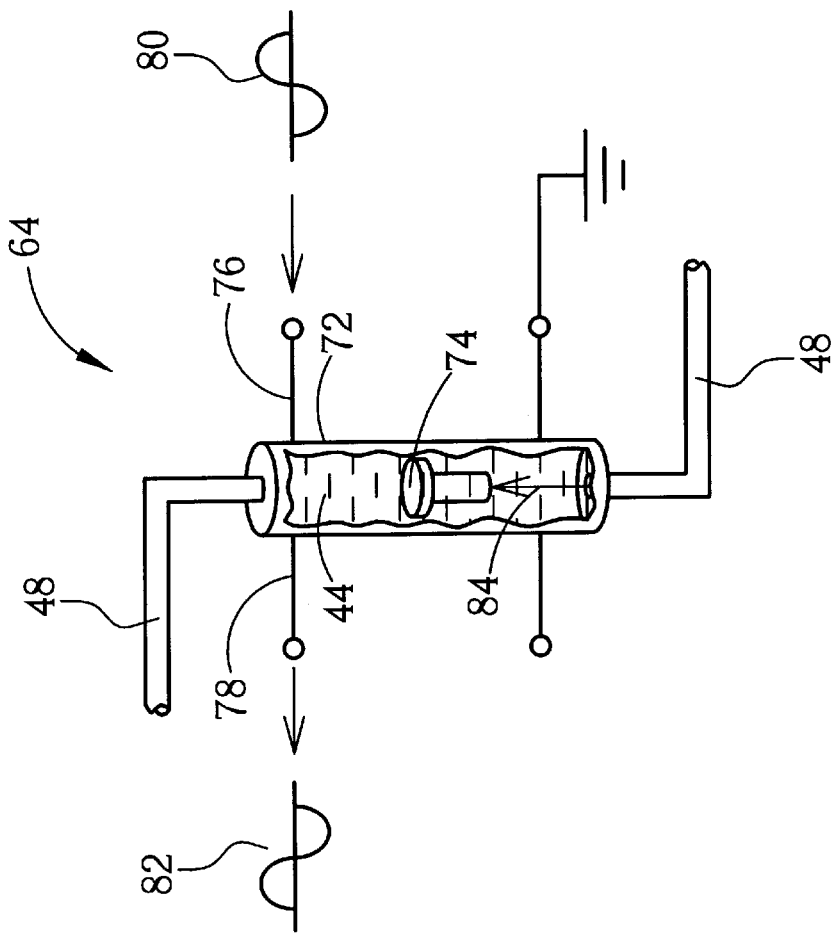
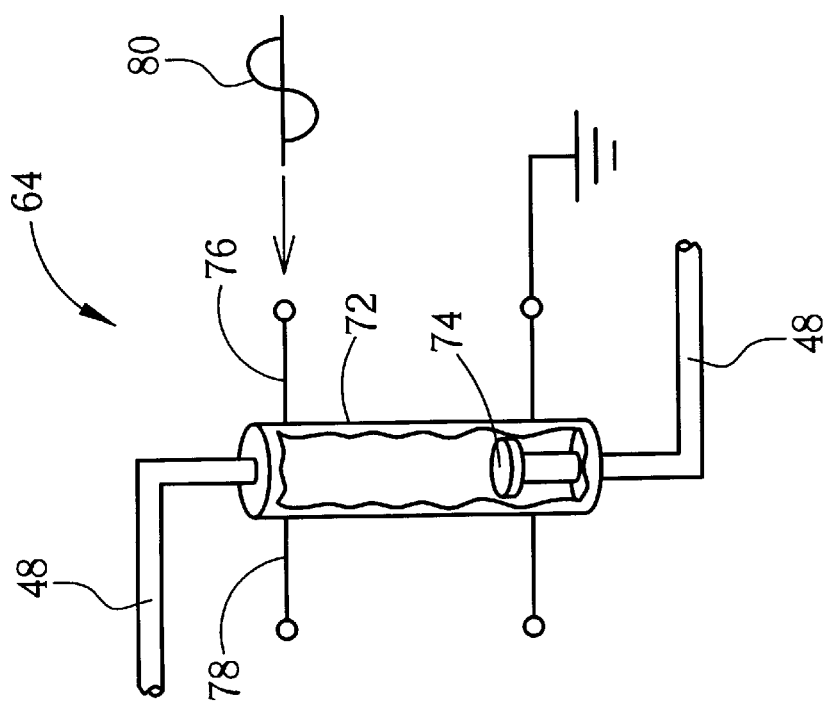
Fig. 4
Fig. 3

FLOW CONTROL DEVICE

BACKGROUND OF THE INVENTION

1. Field of the Invention

The present invention relates to a flow control device, and more particularly, to a flow control device for controlling a flow of a chemical solution supplied by a supply apparatus.

2. Description of the Prior Art

In a semiconductor manufacturing process, many kinds of chemical solutions are used for cleaning, wet etching processes, etc. In order to precisely control the reactions of these solutions, the flow of the solution must be controlled to satisfy the flow velocity, volume and commixture ratios of the semiconductor process.

Please refer to FIG. 1. FIG. 1 is a schematic diagram of a prior art chemical solution supply apparatus 10. The supply apparatus 10 is used to supply a chemical solution 12 for a semiconductor process. The supply apparatus comprises a storage tank 14, a solution transfer device 16, and a pressurizing apparatus 18. The storage tank 14 serves as a reservoir for the chemical solution 12. The pressurizing apparatus 18 supplies high-pressure gas into the storage tank 14 to pressurize the chemical solution 12 and thereby forcing it to flow into a semiconductor processing room (not shown). The solution transfer device 16 is used to route the chemical solution 12 into the processing room. The solution transfer device comprises a chemical flow pipe 20 to route the chemical solution 12, a flow meter 22, a switch valve 24 in series with the chemical flow pipe 20 and a nozzle 26 installed on the end of the chemical flow pipe 20. The flow meter measures the flow of the chemical solution 12. The nozzle 26 uniformly sprays the chemical solution 12.

The pressurizing apparatus 18 comprises a gas input pipe 28 to route high-pressure gas from a high-pressure gas source 30 to the storage tank 14. The pressurizing apparatus also comprises an adjust valve 32 and a gas meter 34 installed in series with the gas input pipe 28 for measuring and adjusting the pressure of the input gas into the storage tank 14 from the gas input pipe 28.

However, in a typical semiconductor factory, for safety and convenience, the pipes for gas and those for liquids are independently installed and operated. During the operation of the prior art supply apparatus 10, the user can only measure and adjust the pressure of the input gas by way of the adjust valve 32 and the gas meter 34. So, during manufacturing operations, the pressure of the gas in the gas input pipe 28 holds a constant value and cannot be adjusted according to the rate of flow of chemical solution 12 as read from the flow meter 22. When the solution transfer device 16 sends the chemical solution 12 into the processing room, the flow of the chemical solution 12 holds a constant value; for example, something like 130 cc/min. The chemical solution 12 used in the semiconductor process could be any combination of corrosive, poisonous or inflammable. Consequently, in the supply apparatus 10, the chemical flow pipe 20 is made of a plastic material, and the installation of any intrusive mechanical or electrical equipment in the pipe is avoided in order to ensure a continuous seal along its length and to reduce the possibility of combustion or leakage. Therefore, the switch valve 24 has only a simplistic on and off ability, which does not require an intrusive mechanical or electrical apparatus. The only choices for flow control of the chemical solution are, in this example, 130 cc/min and 0 cc/min. If the user wants a different rate of flow (like 60 cc/min), the prior art supply apparatus 10 is unable to satisfy the request.

SUMMARY OF THE INVENTION

It is therefore a primary objective of the present invention to provide an adjustable flow control device to solve the above mentioned problems.

In a preferred embodiment, the present invention relates to a flow control device for controlling a flow of a chemical solution supplied by a supply apparatus, the supply apparatus comprising a storage tank for storing the chemical solution, a chemical flow pipe to route the chemical solution into a semiconductor processing room, a pressurizing apparatus to supply gas to the storage tank to make the chemical solution flow into the processing room, the flow control device comprising:

a flow sensor installed in the chemical flow pipe for measuring the flow of the chemical solution in the pipe and generating a relative measurement value; and a control unit comprising a set-up apparatus for setting a target value and a processor electrically connected with the flow sensor and the pressurizing apparatus for generating a control signal to the pressurizing apparatus depending on a difference between the target value and the measurement value to adjust the flow of the chemical solution in the chemical flow pipe, until the measurement value reaches the target value.

It is an advantage of the present invention that the flow control device can automatically adjust the pressure of the gas and thereby supply different rates of chemical flow to satisfy various user or process requirements.

These and other objectives of the present invention will no doubt become obvious to those of ordinary skill in the art after reading the following detailed description of the preferred embodiment which is illustrated in the various figures and drawings.

BRIEF DESCRIPTION OF THE PREFERRED EMBODIMENT

FIG. 3 is an inner structure schematic diagram of a flow sensor (static).

FIG. 4 is an inner structure schematic diagram of a flow sensor (dynamic).

DETAILED DESCRIPTION OF THE PREFERRED EMBODIMENT

Figure 1:
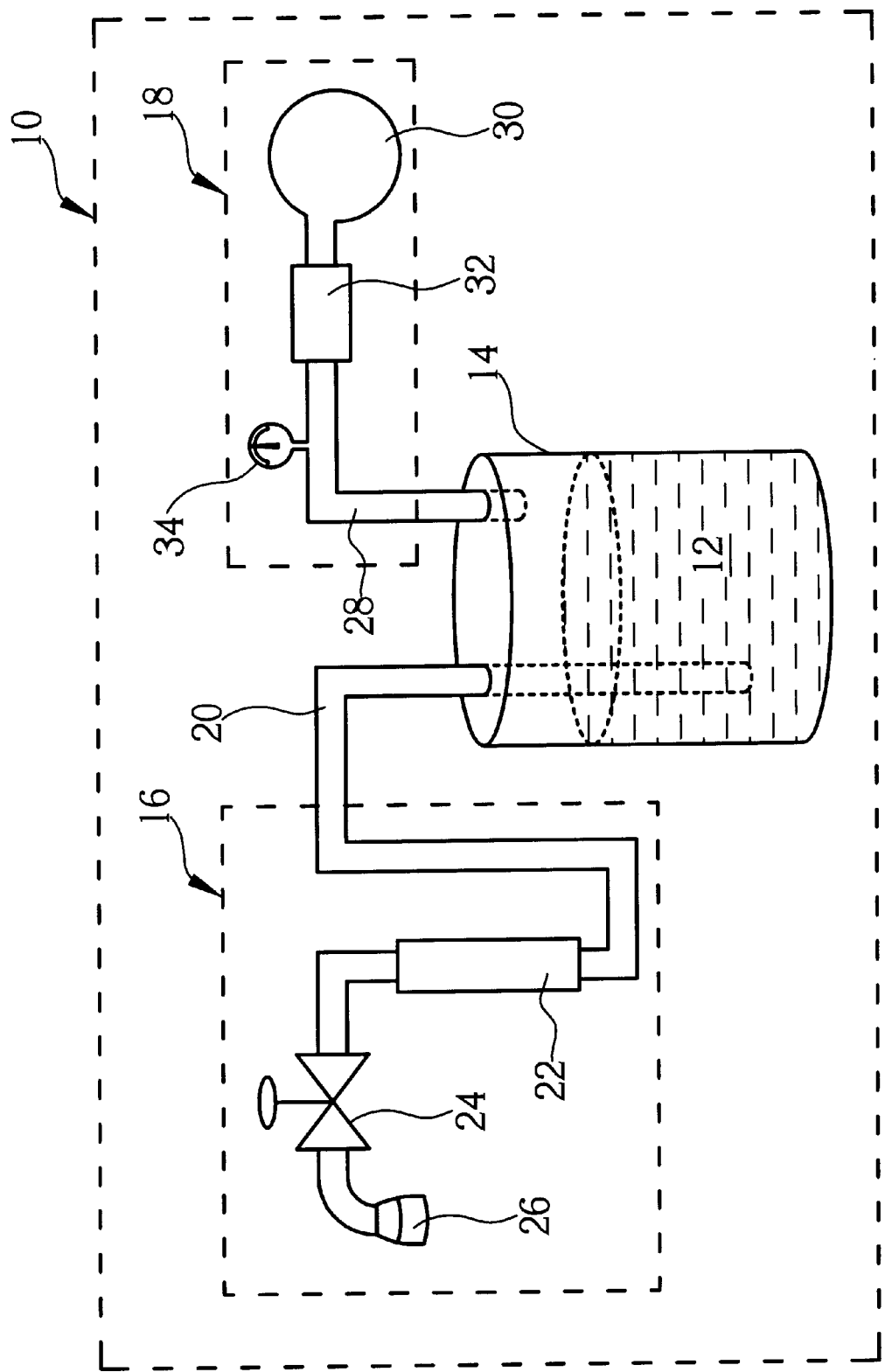
FIG. 1 is a schematic diagram of a prior art supply apparatus for a chemical solution.
Figure 2:
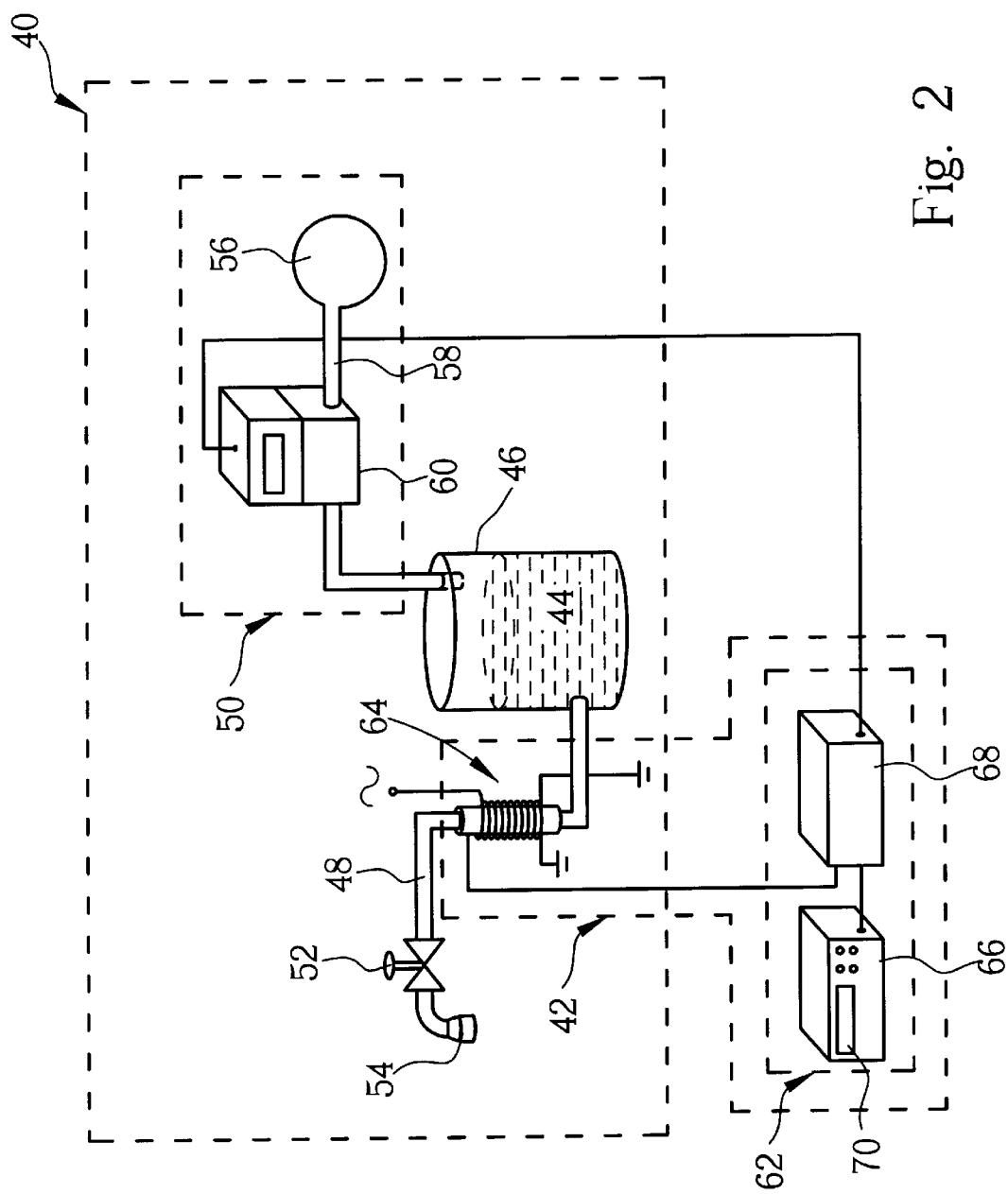
FIG. 2 is a structure schematic diagram of a supply apparatus and a flow control device according to the present invention.

Please refer to FIG. 2. FIG. 2 is a structure schematic diagram of a supply apparatus 40 connected to a flow control device 42 according to the present invention. The flow control device 42 in the present invention is used to control the flow of a chemical solution 44 from the supply apparatus 40. The supply apparatus 40 comprises a storage tank 46 for storing the chemical solution 44, a chemical flow pipe 48 to route the chemical solution 44 into a semiconductor processing room (not shown), a pressurizing apparatus 50 to supply gas to the storage tank 44 to make the chemical solution 44 flow into the processing room, a switch valve 52 installed in series with the chemical flow pipe 48, and a nozzle 54 installed on the end of the chemical flow pipe 48 to provide a uniform spray of the chemical solution.

The flow control device 42 comprises a control unit 62 and a flow sensor 64 that is connected in series with the chemical flow pipe 48. The control unit 62 comprises a set-up apparatus 66 and a processor 68.

The pressurizing apparatus 50 comprises a high-pressure gas source 56 for supplying high-pressure gas into the storage tank 46 through a gas input pipe 58, and an electro-Pneumatic regulator valve 60 installed in series with the gas input pipe 58. The electro-Pneumatic regulator valve 60 is electrically connected to the control unit 62 and will adjust the pressure of the gas flowing into the storage tank 46 depending on a control signal given by the processor 68 in the control unit 62.

The position of the flow sensor 64 is very close to the storage tank 46 to avoid any time delays while sensing the out-flow from the storage tank 46. The flow sensor 64 measures the flow of the chemical solution 44 in the chemical flow pipe 48 and generates a relative measurement value that is sent to the control unit 62. The set-up apparatus 66 is used to set a target value, and comprises a display 70 to show both the target value and the measurement value. The processor 68 is electrically connected to the flow sensor 62 and the pressurizing apparatus 50, and has a comparative circuit (not shown) to generate a control signal that is sent to the electro-Pneumatic regulator valve 60 of the pressurizing apparatus 50. This control signal is based upon a difference between the target value and the measurement value. Depending on the control signal, the electro-Pneumatic regulator valve 60 will adjust the flow of high-pressure gas into the storage tank 46, and thereby adjust the flow of the chemical solution 44 in the chemical flow pipe. These adjustments continue until the measurement value reaches the target value.

Figure 5:
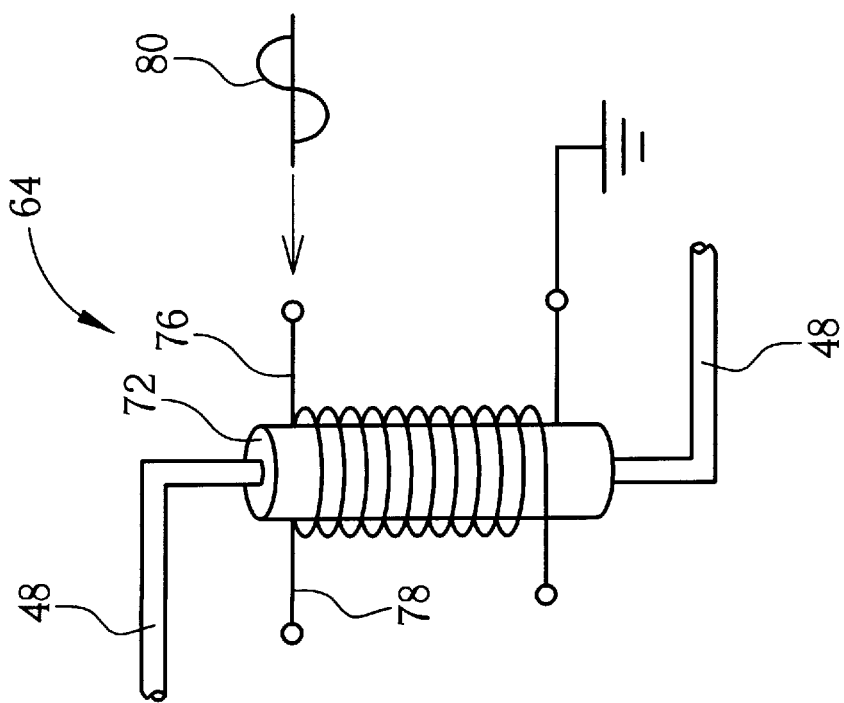
FIG. 5 is an outer structure schematic diagram of a flow sensor.

Please refer to FIG. 3 to FIG. 5. FIG. 3 is an inner structure schematic diagram of the flow sensor (static). FIG. 4 is an inner structure schematic diagram of the flow sensor (dynamic). FIG. 5 is an outer structure schematic diagram of the flow sensor. The flow sensor 64 comprises a hollow cylinder 72, a choking magnetic core 74, and a first and second conductive coil 76, 78 wrapped around the outer wall of the hollow cylinder 72. The hollow cylinder 72 is vertically attached in series with the chemical flow pipe 48 to direct the chemical solution to flow upward through the hollow cylinder 72. The choking magnetic core 74 is movably positioned inside and at the bottom of the hollow cylinder 72.

The first conductive coil 76 uses an alternating current to generate an alternating magnetic flux (not shown) in the hollow cylinder 72, and the second conductive coil 78 is used to sense the changing magnetic flux and generate a relative induced-current 82. When the chemical solution 44 flows into the hollow cylinder 72, the flow changes the position of the choking magnetic core 74. The changing position of the choking magnetic core 74 causes a change in the alternating magnetic flux that the second conductive coil 78 senses and sends to the control unit 62 as the change of the magnetic flux. Then, the processor 68 performs an operation to convert this change of the magnetic flux to a measurement value of the flow in the chemical flow pipe 48. In FIG. 4, the direction of the arrow 84 indicates the direction of the chemical solution 44 flowing through the hollow cylinder 72.

Figure 6:
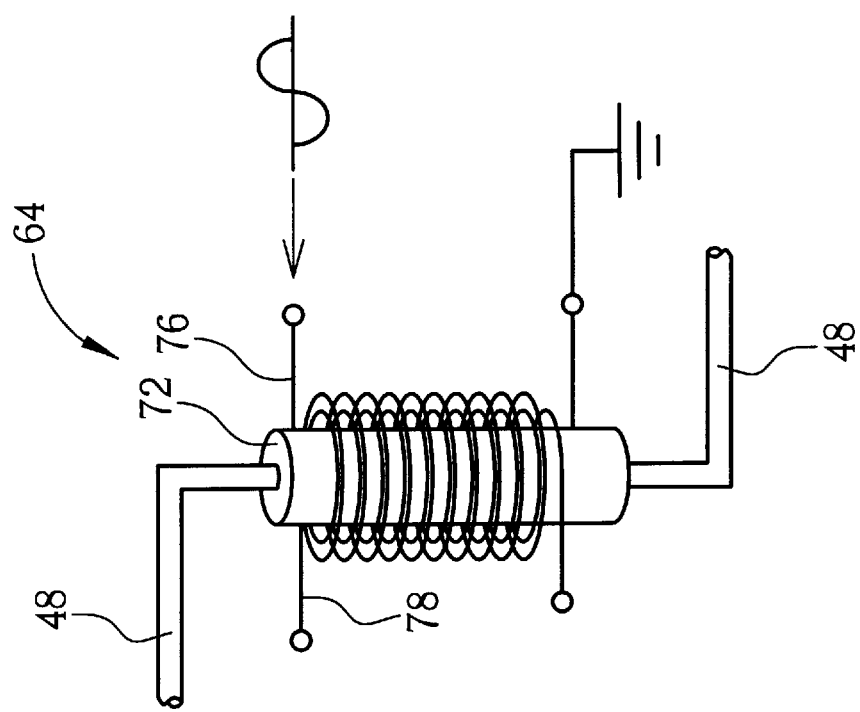
FIG. 6 is an alternative outer structure schematic diagram of a flow sensor.

Please refer to FIG. 6. FIG. 6 is an alternative outer structure schematic diagram of the flow sensor. The first and second conductive coil 76, 78 can be wrapped in an overlapping fashion around the outer wall of the hollow cylinder 72. This overlapping fashion means that the first conductive coil 76 is wrapped on the outer wall of the hollow cylinder 72 first, and then the second conductive coil 78 is wrapped on the first conductive coil 76. Alternatively, the second conductive coil 78 can be wrapped on the outer wall of the hollow cylinder 72, and then the first conductive coil 76 is wrapped on the second conductive coil 78. This overlapping fashion also senses the relative changes of the magnetic flux due to the hoking magnetic core 74, producing the relative measurement values of the flow in the chemical flow pipe 48.

The flow control device 42 (FIG. 2) utilizes the flow sensor 64 to receive the relative measurement value of the chemical solution 44 in the chemical flow pipe 48, then sends the value to the processor 68 where it is converted to a measurement value and compared with the target value set up by the set-up apparatus 66. Based upon the difference between the target value and the measurement value, a control signal is generated and sent to the electro-Pneumatic regulator valve 60 of the pressurizing apparatus 50 to adjust the pressure of the gas so the flow of the chemical solution 44 will satisfy the target value. In this manner, the flow control device 42 can automatically adjust the gas pressure to control the flow of the chemical solution 44 precisely, thereby satisfying different process requirements and avoiding unnecessary loss of chemical solution or gas, which also reduces operating expenses.

In contrast to the prior art supply apparatus 10, the flow control device 42 can measure the flow of the chemical solution 44 at any time and adjust the pressure of gas to control the flow of the chemical solution 44 to satisfy the target value set up by the user. The target value is entered into the control unit 62 and is used to automatically generate the control signal that depends on the difference between the measurement value and target value. The control signal controls the flow of high-pressure gas to adjust the pressure on the chemical solution 44, and so achieve the target value. The flow meter 22 of the prior art supply apparatus 10 can only measure the flow of the chemical solution, and does not automatically adjust the pressure of input gas. The flow control device 42 automatically measures and adjusts the pressure of input gas and chemical solution, and controls the flow of chemical solution precisely.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A flow control device for controlling a flow of a chemical solution supplied by a supply apparatus, the supply apparatus comprising a storage tank for storing the chemical solution, a chemical flow pipe to route the chemical solution into a semiconductor processing room, a pressurizing apparatus to supply gas to the storage tank to make the chemical solution flow into the processing room, the flow control device comprising:

a flow sensor installed in the chemical flow pipe for measuring the flow of the chemical solution in the pipe and generating a relative measurement value; and a control unit comprising a set-up apparatus for setting a target value and a processor electrically connected with the flow sensor and the pressurizing apparatus for generating a control signal to the pressurizing apparatus depending on a difference between the target value and the measurement value to adjust the flow of the chemical solution in the chemical flow pipe, until the measurement value reaches the target value.

2. The flow control device of claim 1 wherein the set-up apparatus of the control unit further comprises a display to show the target value and the measurement value.

3. The flow control device of claim 1 wherein the pressurizing apparatus comprises:

a high-pressure gas source for supplying high-pressure gas into the storage tank through a gas input pipe; and an electro-Pneumatic regulator valve installed on the gas input pipe that is electrically connected with the control unit wherein, depending on the control signal given by the processor, the regulator valve will adjust the pressure of the gas flowing into the storage tank.

4. The flow control device of claim 1 wherein the flow sensor comprises:

a hollow cylinder attached vertically in series with the chemical flow pipe to direct the chemical solution in the chemical flow pipe to flow upward;

a choking magnetic core movably positioned in the bottom of the hollow cylinder wherein the flow of chemical solution through the hollow cylinder changes the position of the choking magnetic core;

a first and second conductive coil wrapped around the outer wall of the hollow cylinder wherein the first conductive coil uses an alternating current to generate a magnetic flux in the hollow cylinder, and the second conductive coil is used to sense the change of the magnetic flux to generate a relative induced-current;

wherein when the position of the choking magnetic core has been changed, the second conductive coil will sense the corresponding change of the magnetic flux caused by the choking magnetic coil, and the relative induced current can be used by the processor as the relative measurement value in the chemical flow pipe.

* * * * *